Feb. 22, 1944.    R. F. FISCHER ET AL    2,342,510
CAMERA
Filed June 10, 1941    3 Sheets-Sheet 1

INVENTORS
RICHARD F. FISCHER
ERNEST B. BALDRIDGE
ATTORNEYS

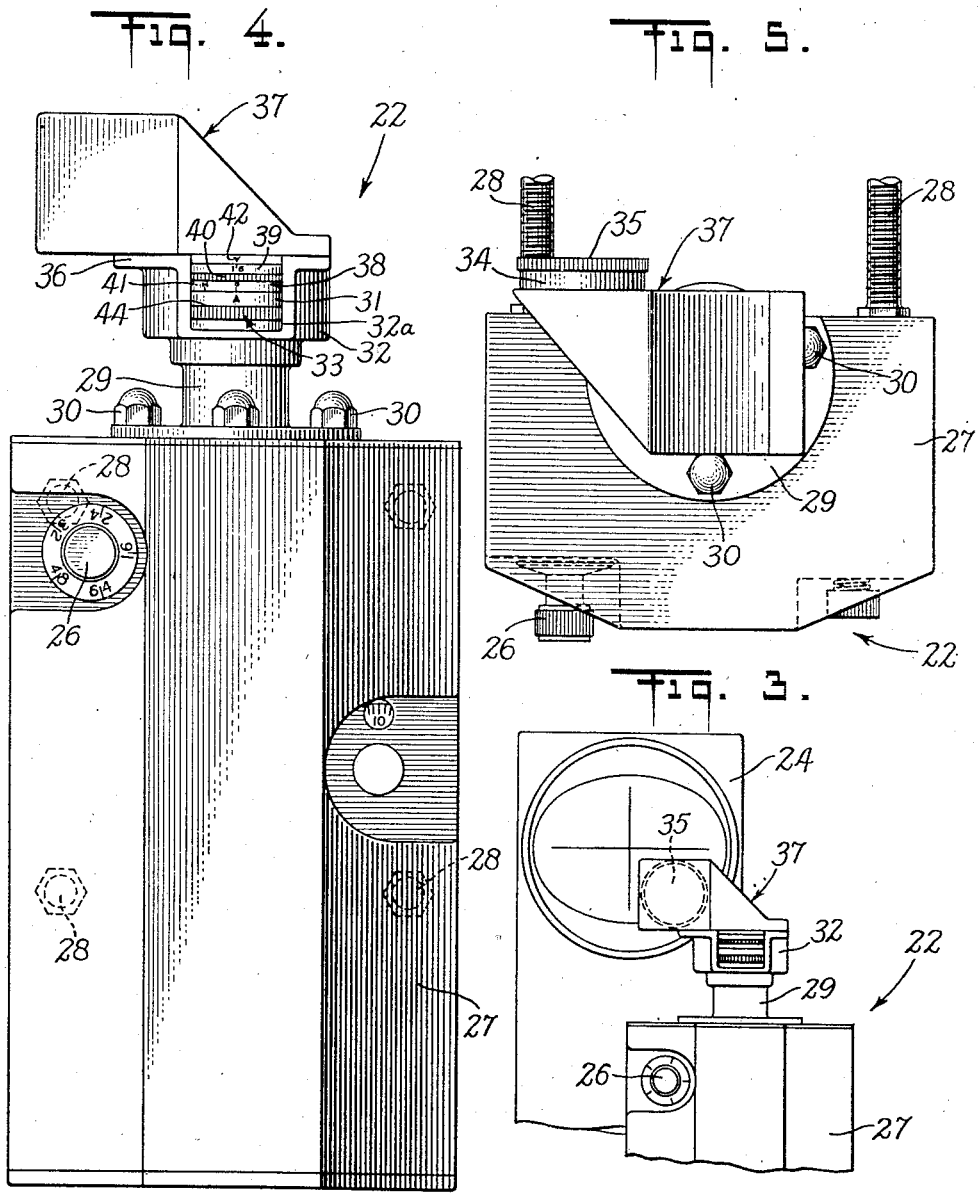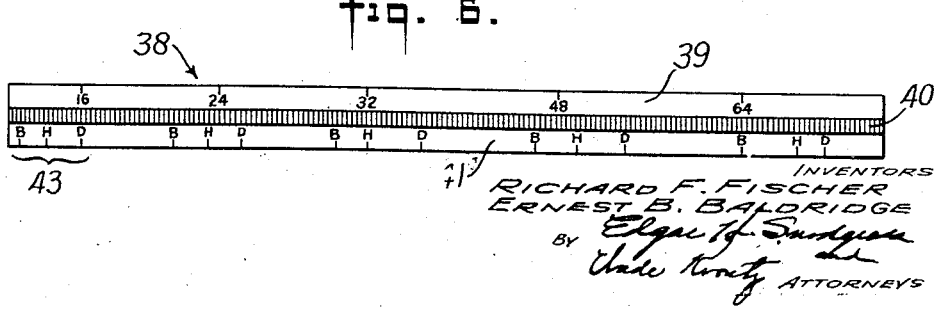

Feb. 22, 1944.     R. F. FISCHER ET AL     2,342,510
CAMERA
Filed June 10, 1941     3 Sheets-Sheet 3
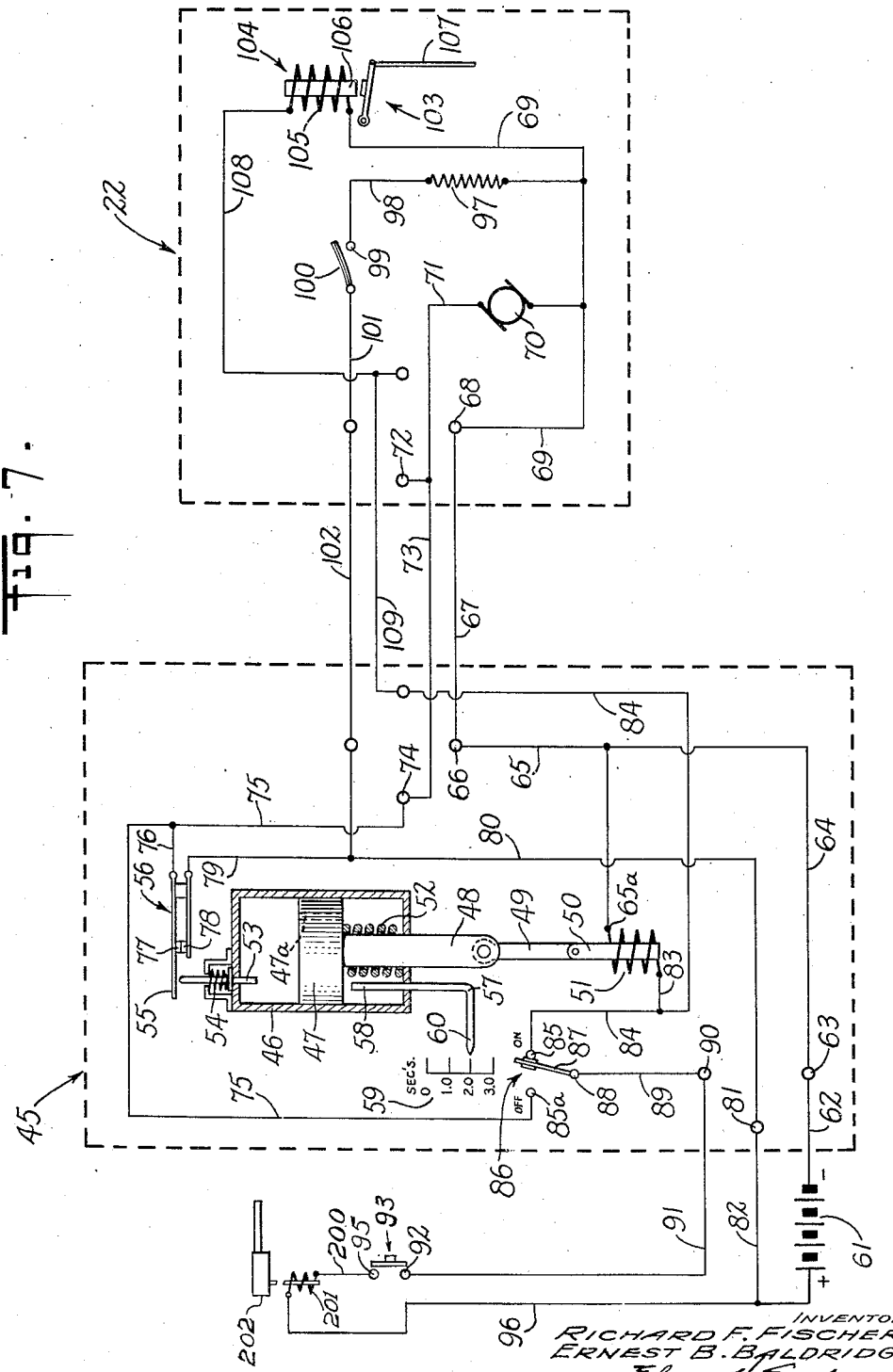

Patented Feb. 22, 1944

2,342,510

UNITED STATES PATENT OFFICE 2,342,510

CAMERA

Richard F. Fischer and Ernest B. Baldridge, Dayton, Ohio

Application June 10, 1941, Serial No. 397,432

10 Claims. (Cl. 88—16)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to photographic apparatus, and more particularly to a so-called machine gun camera adapted to photograph the results of actual combat firing or to photograph a target during simulated combat work for training purposes.

Heretofore, when the occasion demanded, more or less conventional moving picture cameras have been used on military aircraft for photographing aerial combat. These cameras usually have little or no cooperative relationship to the airplane armament, sometimes being flexibly mounted and operated quite independently of the guns, and, even when having a fixed mount, being operable independently only of the guns. In so far as we are aware, these cameras can only photograph the results of aerial combat when thus independently operated, with the result that the operator's attention must necessarily be divided between his guns and the camera.

When machine gun cameras are used in simulated aerial combat for training purposes, it has been the practice to provide a dummy gun incorporating the camera, the unit having either a fixed or flexible mount on the airplane. This, of course, necessitates removal of the normal armament of the airplane, to permit installation of the dummy. In either use of the camera, scoring is difficult because the speed of light, being much greater than the bullet velocity, precludes the recording of results of actual or simulated fire after the camera stops operating. Furthermore, the limitations of these cameras restrict their efficiency in use for training purposes, because such use results in conditions which complicate the scoring of the photographic results to the extent that laborious and difficult interpolation is necessary to correct the score. Furthermore, under actual combat conditions, it is obvious that the pilot's attention should be concentrated on the manoeuvring of his airplane and the operation of his guns without having to be diverted by the necessity of adjustment of the camera or operation thereof.

It is accordingly among the objects of this invention to provide a machine gun camera of the above nature which, in addition to being ruggedly and durably constructed has the inherent capacity of faithfully recording the results of actual or simulated aerial combat. More specifically, it is an object of this invention to provide a machine gun camera of the above nature, together with mechanism capable of maintaining the camera in operation subsequent to cessation of gun fire so as to record the effect of bullets between the gun and the target immediately after the gun stops firing. Other objects will be in part apparent, and in part pointed out hereinafter.

The invention accordingly consists in the features of construction, combinations of elements, and arrangements of parts as will be exemplified in the structure to be hereinafter described and the scope of the application of which will be indicated in the following claims.

In the drawings, in which is shown one of the various possible embodiments of our invention, Figure 1 is a fragmentary top plan view of an airplane having installed thereon a machine gun equipped with our camera;

Figure 3 is an enlarged fragmentary elevation of the camera connected to the cockpit gun sight;

Figure 4 is an enlarged elevation of our camera;

Figure 5 is a top plan view of our camera;

Figure 6 is an enlarged developed elevation of the lens stop system in the camera; and, Figure 7 is a schematic view of a camera overrun device, together with a wiring diagram therefor and for the camera.

Similar reference characters refer to similar parts throughout the various views of the drawings.

Figure 1:
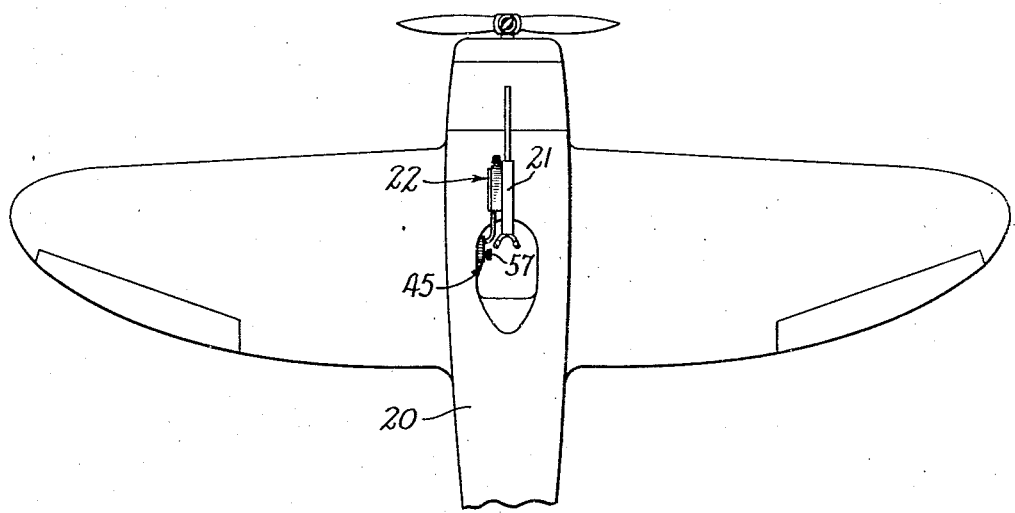
Figure 2:
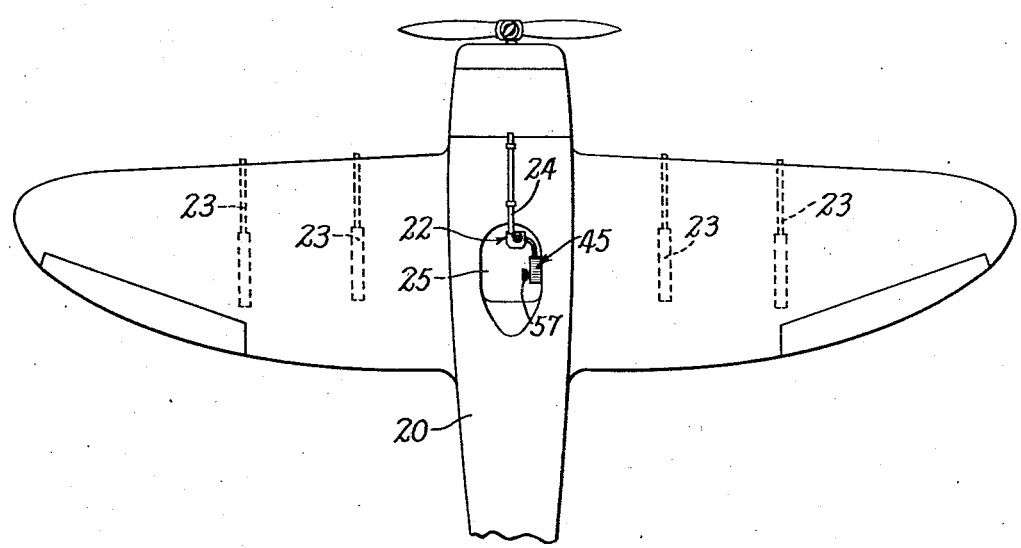
Figure 2 is a view similar to Figure 1, but showing our camera installed in conjunction with a cockpit gun sight.

With reference to Figure 1, an airplane 20 has attached thereto a machine gun 21, to the side of which our camera generally indicated at 22 is bolted, the camera being boresighted with the gun, and in effect an integral part thereof. As shown in Figure 2, airplane 20 includes a plurality of wing guns 23 which, as in the case of gun 21 (Figure 1) are aimed by aiming the airplane at the target. In this instance, however, camera 22 (Figure 2) is not directly connected to any of the guns, but rather is installed in conjunction with a gun sight 24, mounted in the airplane cockpit 25, as will be described in more detail hereinbelow.

Referring now to Figures 4 and 5, camera 22 is preferably a conventional 16 millimeter camera such as, for example an "Eastman Cine Kodak," except that instead of including the conventional spring drive, such drive is replaced by an electric motor and change gear transmission (not shown) also of conventional nature, capable of feeding the film at 16, 24, 32, 48 or 64 frames per second, in accordance with the setting of a knob 26 on camera 22.

Still referring to Figures 4 and 5, camera 22 includes a casing 27 which houses the usual film magazine, shutter operating mechanism, film feeding system and drive therefor, none of which we have shown or described, such mechanism being of conventional character. Secured to and extending from casing 27 (Figure 5) are a plurality of securing studs 28 by which the camera may be secured either to gun 21 (Figure 1) or gun sight 24 (Figure 2). A flanged hub 29 is bolted to the top of casing 27 by bolts 30, and in this hub is disposed a camera lens 31 of suitable characteristics. Hub 29 has secured to or integral therewith an enlarged housing 32 having an opening 32a to provide visible and manual access to a lens stop or iris diaphragm operating system generally indicated at 33.

Housing 32 also includes a flange 36 to which an erecting system, generally indicated at 37 is secured. As is better shown in Figure 5, erecting system 37 comprises a conduit for the transmission of light through the camera lens from a direction normal thereto, and includes a suitable mount 34 to support a filter 35. Through the provision of erecting system 37, camera 22 (Figure 3) may be installed vertically in the airplane cockpit (see Figure 2) so as to take up as little room as possible while being mounted in relation to gun sight 24. Thus, the erecting system covers up but a small portion of the lower corner of the reflector of the collimator or other type of gun sight. The camera, preferably being provided with a lens of infinite focus, is capable of photographing not only the target, but also the gun sight reticle or any other apparatus used for the purpose of sighting the guns. As the gun sight is boresighted with the machine guns on the airplane, camera 22 is capable of photographing the position of the target at which the guns are firing or at which fire is being simulated, and accordingly can record the relationship of the target with respect to the reticle of the gun sight, rendering scoring merely a matter of looking at the photographic record.

When camera 22 is mounted directly on the gun, as shown in Figure 1, erecting system 37 is not used, it being used only when the camera is mounted in the cockpit adjacent gun sight 24, as shown in Figure 3. Also, when the camera is mounted in or on the gun sight, it is used only as a fixed, i. e., stationary, camera and under such circumstances is preferably provided with a three-inch lens. The camera can, of course, be mounted on a flexible gun or a gun turret, and under such circumstances we prefer to use a one-inch lens or a lens of approximately that focal length, but without the erecting system 37. Inasmuch as the camera lens is focused at infinity, as noted above, no provisions are made for focusing.

Lens stop system 33 includes a movable indicator ring generally indicated at 38 which, as is more clearly shown in Figure 6, has an upper band 39 provided with spaced reference marks and indicia, indicative of the film feed rate selected at any given firing time. As the gear change transmission (not shown) referred to hereinabove is adjustable for feeding the film at the rates mentioned, band 39 of indicator ring 38 is marked with these rates. Preferably ring 38 is also provided with a knurled raised section 40 to facilitate operation of the ring. A stationary pointer or indicator 42 (Figure 4) is provided on the lens system of the camera to register with the reference point on ring band 39 as selected by the operator, and when ring 38 is so positioned, the operating ring for the iris diaphragm of the camera may be adjusted to provide the proper opening for the selected film feed rate, as will now be described.

Indicator ring 38 also includes a band 41 having a group of lens stop indicating marks, such as group 43, for each film feed rate. Each group includes three marks "B," "H," "D," i. e., bright, hazy and dull, but the spacing of the "B," "H," "D" marks in each group, in relation to their film feed rate, is different from that of any other group. These "B," "H," "D" marks are indicative of lens stops for each film feed rate, and represent arbitrarily chosen diaphragm openings for bright, hazy and dull light conditions for each film feed rate, as experience has shown that no finer diaphragm adjustment is necessary because of the latitude of the film used. Hence, the pilot, before nearing his target, having selected the film feed rate desired and set the driving mechanism of the camera accordingly, and thereafter having adjusted indicator ring 38 with reference to pointer 42 (Figure 4) will find it a simple matter to adjust the iris diaphragm operating ring 44 to the "B," "H" or "D" mark visible through opening 32a in housing 32. Thus, the pilot or operator need not attempt an accurate estimation of the proper lens stop to be used, and the margin of error which would otherwise be inevitable in the case of inexperienced operators is substantially reduced. By way of example, for a film feed rate of 16 frames per second, references "B," "H" and "D" on ring band 41 (Figure 6) might represent respectively openings f16, f11 and f8, whereas for a film feed rate of 64 frames per second, references "B," "H" and "D" might represent respectively film stops f8, f5.6 and f4.5.

As noted hereinabove, it is important that the camera continue to operate for a period of time, preferably accurately predeterminable, after the gun or guns stop firing. The purpose of this is to photograph the effect of the bullets in the air between the guns and target after the guns stop firing, i. e., the effect of the bullets fired a few seconds before the guns cease to operate. It is apparent that if the camera and gun cease operating simultaneously, the camera cannot photograph the effect of bullets fired three or four seconds, for example, before the guns cease firing. When it is considered that a three or four second burst from four to eight wing guns would result in a highly destructive burst of approximately 200 to 400 bullets, the desirability of photographing the effect of such a burst is immediately apparent. The same proposition, of course, holds true during simulated combat work, as otherwise the scoring would be inaccurate. Hence, in order to photograph the effect of the bullets fired several seconds before the gun ceases to operate, we provide the overrun device generally indicated at 45 in Figure 7.

Overrun 45 may take the form of a dashpot having a cylinder 46 in which a plunger 47 is reciprocably disposed. A rod 48, connected to piston 47, extends through the bottom of cylinder 46, and has its outer end connected as by link 49 to the plunger 50 of a solenoid 51. A spring 52 is coiled about rod 48 between piston 47 and the bottom of cylinder 46 so as to urge piston 47 upwardly, as viewed in Figure 7. On the top of cylinder 46 is a pin 53 or the like, spring urged downwardly as by a spring 54, but engageable by plunger 47 on its upward stroke to be forced upwardly thereby against a switch arm 55 of a switch generally indicated at 56 in the control circuit of the camera motor. A stop 57 includes an arm 58 extending upwardly through the bottom of cylinder 46 and this stop is adjustable along a graduated scale 59 with respect to which the stop pointer 60 registers. Preferably scale 59 is graduated in seconds and fractions thereof so that the loading or downward stroke of plunger 47 may be limited as desired. Hence if stop pointer 60 is set at two seconds, plunger 47 is drawn downwardly upon energization of solenoid 51 by an amount which limits its upward or return stroke under the bias of spring 52 to a period of two seconds. In other words, cylinder 46 being fluid filled, it takes two seconds for the fluid on top of plunger 47 to bleed through plunger channel 47a into the bottom of the cylinder. When the plunger reaches the top limit of its travel, it forces pin 53 against switch arm 55, causing switch 56 to break the camera motor circuit and stop the camera, all as will be described hereinbelow.

Still referring to Figure 7, the main airplane battery is indicated at 61 and has its negative side connected by a lead 62 to a terminal 63 located on the overrun device. This terminal is connected by a lead 64 to a lead 65, one end 65a of which is connected to solenoid 51, and the other end of which is connected to a terminal 66. Terminal 66 is connected by a lead 67 to a terminal 68 on camera 22, and this terminal is in turn connected by a lead 69 to one side of the camera operating motor. The other side of motor 70 is connected by a lead 71 to a terminal 72 on the camera, and this terminal is connected by a lead 73 to a terminal 74 on the overrun device. A lead 75 connects terminal 74 to a lead 76 in turn connected to movable arm 55 of switch 56. Arm 55 carries a contact 77 engageable with a stationary contact 78 connected to a lead 79. Lead 79 is connected by a lead 80 to a terminal 81 on the overrun device, which latter terminal is connected to the positive side of battery 61 as by a lead 82. From the above, it will appear that when switch 56 is closed, as shown in Figure 7, a circuit through motor 70 is closed to operate the motor. Similarly, when switch 56 opens, the circuit to motor 70 is broken and the camera stops operating. It might be noted at this point that leads 62, 64, 65, 67 and 69 comprise a common ground not only for the camera motor 70, but also for other electrically actuated devices associated with the camera that will be described hereinbelow.

As noted hereinabove, one side of solenoid 51 is connected to the negative side of battery 61 by leads 62 and 64. The other side of solenoid 51 is connected as by a lead 83 to a lead 84 running to the "on" contact 85 of a double pole single throw switch, generally indicated at 86. Switch 86 includes an arm 87 connected to a terminal 88, in turn connected by a lead 89 to a terminal 90, which latter terminal is connected by a lead 91 to one contact 92 of a switch generally indicated at 93. Switch 93 is located on the control stick of the airplane and is manually operable by the pilot. The other contact 95 of switch 93 is connected by a line 200 to one side of a solenoid generally indicated at 201, the other side of which is connected by a lead 96 to the positive side of battery 61. Solenoid 201, when energized causes gun 202 to fire. Thus, switch 93 controls not only the firing mechanism of the gun, but also when closed causes the camera to start, as will be described.

Switch 93 includes a movable bridge 94 which, when the switch is closed, bridges contact 92 and the other contact 95 of switch 93. Contact 95 is connected by lead 96 through solenoid 201, as described, to the positive side of battery 61, and accordingly it will appear that when switch 93 is closed, a circuit is established to energize solenoid 51 as follows: contact 95, line 200, solenoid 201, lead 96, battery 61, lead 62, lead 64, the coil of solenoid 51, lead 83, lead 84, switch arm 87, lead 89, lead 91, switch contact 92 and bridge 94, back to switch contact 95. It should also be noted that switch 86 on the overrun device includes an "off" terminal 85a which is connected to one side of camera motor 70 by way of leads 75, 73 and 71, so that the camera may be operated independently of the overrun device 45 merely by throwing arm 87 of switch 86 to the "off" contact 85a.

From the above, it will now appear that when the pilot closes his stick switch 93, both solenoid 51 and motor 70 are energized, the solenoid being energized by reason of the circuit just described and the motor by reason of the engagement between contacts 77 and 78 of switch 56 upon downward movement of contact plunger 47 as effected by solenoid 51. The solenoid plunger, of course, will be held at its bottom position as long as solenoid 51 is energized, and the solenoid is energized as long as stick switch 93 is closed. When stick switch 93 is opened, solenoid 51 is deenergized, and accordingly dashpot plunger 47 begins to rise under the bias of spring 52. When plunger 47 reaches the top of its travel, pin 53 opens switch 56 and, as noted above, the circuit to motor 70 is broken and the camera stops.

Inasmuch as cameras of the character under consideration are often operated at high altitudes, where the temperature is often well below freezing, we preferably include a heater 97. One side of heater 97 is connected to lead 69 and accordingly to the common ground of the system. The other side of the heater is connected by a lead 98 to a contact 99 of a thermostatic switch 100, which switch is connected by leads 101 and 102 to lead 79. As lead 79 is connected by leads 80 and 82 to the positive side of battery 61, it will appear that heater 97 is connected across the battery. Heater 97 is, of course, periodically energized in accordance with the operative condition of thermostatic switch 100.

To facilitate the scoring of the photographic results, it is desirable that mechanism be included to provide an indication on the film of the operative condition of overrun device 45. To this end, we have provided an overrun indicator generally indicated at 103, which includes a solenoid 104 having a coil 105 and a plunger or armature 106. When solenoid 104 is energized, its plunger 106 pivots a pointer or indicator 107, the free end of which is located with respect to an aperture (not shown) in camera 22 so that the pointer extends within this opening and is photographed when the overrun device operates. Overrun indicator solenoid coil 105 has one end connected to lead 69, and accordingly to the common ground of the electrical system. The other end is connected by leads 108 and 109 to lead 84 and accordingly to stick switch 93 through overrun switch 86 and lead 91. Thus it will appear that when stick switch 93 is closed, overrun device solenoid 51 and overrun indicator 104 are both energized and accordingly are both deenergized when stick switch 93 is opened. Deenergization of overrun indicator solenoid 104 causes the end of pointer 107 to enter the camera aperture referred to and accordingly indicate the beginning of overrun operation.

From the above it will appear that we have provided a machine gun camera which attains the various objects set forth hereinabove in a thoroughly practical and efficient manner.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

We claim:

1. An operating and indicating device for a diaphragm adapted to be mounted on a motion picture camera capable of selective operation at any one of a plurality of different film feed rates, said device comprising, in combination, a housing adapted to be secured to said camera, means forming an opening in said housing, a ring rotatably mounted in said housing and adapted to be connected to the lens diaphragm for operation thereof, said ring having a reference mark thereon, a second ring rotatably mounted in said housing adjacent said first ring and freely rotatable relative thereto, portions of both of said rings being visible through said housing opening, said second ring having two spaced parallel indicating portions thereon, a film feed rate indicium on one of said portions, a group of diaphragm opening marks on the other of said portions adjacent said indicium and registerable with said reference mark on said first ring, and a pointer on said housing with reference to which the film feed rate indicium may be set.

2. In apparatus of the character described, in combination, a machine gun having firing mechanism adapted to be electrically actuated by the closing of a main switch, a motion picture camera operatively associated with said gun and so arranged with respect thereto as to photograph the results of actual or simulated fire of the gun, an electric motor for operating said camera, an operating circuit including a source of current and a normally open switch connected to said motor and adapted to energize said motor upon closing of said normally open switch, a control circuit including a main switch and a solenoid and said firing mechanism and connected to said source of current, closing of said main switch being adapted to actuate said firing mechanism, means forming an operative connection between said solenoid and said normally open switch whereby energization of said control circuit by closing said main switch simultaneously actuates said firing mechanism and closes said operating circuit to actuate said camera motor, means rendered operative upon opening of said main switch for maintaining said operating circuit closed a predetermined time after opening of said control circuit to maintain said camera in operation subsequent to cessation of operation of said firing mechanism, and means conditioning for operation said maintaining means upon closing of said main switch.

3. Apparatus of the character described, in combination, a motion picture camera having a diaphragm and capable of selective operation at any one of a plurality of different film feed rates, a ring rotatably mounted on the camera and connected to said diaphragm for operation thereof, said ring having a reference mark thereon, a second ring rotatably mounted on said camera adjacent said first ring and freely rotatable relative thereto, means forming spaced indicia on a portion of said second ring indicative of the several film feed rates at which the camera is capable of operating, said second ring being freely operable to indicate the film feed rate selected, means forming a plurality of groups of diaphragm opening marks on another portion of said second ring, each of said groups of diaphragm opening marks being located in the general vicinity of one of said indicia, said groups of marks being located adjacent said first ring whereby the reference mark on said first ring may be moved adjacent that one of the marks selected, and means forming a stationary pointer on said camera with reference to which the selected one of said indicia may be set.

4. Apparatus of the character described, in combination, a motion picture camera having a diaphragm and capable of selective operation at any one of a plurality of different film feed rates, a member movably mounted on the camera and connected to said diaphragm for operation thereof, said member having a reference mark thereon, a second member movably mounted on said camera adjacent said first member and freely movable relative thereto, means forming spaced indicia on a portion of said second member indicative of the several film feed rates at which the camera is capable of operating, said second member being freely operable to select and indicate the desired film feed rate, means forming a plurality of groups of diaphragm opening marks on another portion of said second member, each of said groups of diaphragm opening marks being located in the general vicinity of one of said indicia, said groups of marks being located adjacent said first member so that the reference mark on said first member may be moved adjacent that one of the marks selected, and means forming a stationary pointer on said camera with reference to which the selected one of said indicia may be set.

5. In apparatus for photographing actual or simulated aerial combat, in combination, a machine gun, electrically actuated means for firing said gun, a motion picture camera for photographing the results of actual or simulated fire of said gun, electrically actuated means for operating said camera, a camera circuit energizable to actuate said camera operating means, a gun circuit energizable for actuating said gun firing means, means including a normally open switch in said camera circuit actuated by said gun circuit upon energization thereof for closing said camera circuit whereby the gun and camera are operated simultaneously, time delay means set into operation upon deenergization of said gun circuit for opening said camera circuit switch after a predetermined period of time thereby to keep the camera operating subsequent to deenergization of said gun circuit, and means conditioning for operation said time delay means upon energization of said gun circuit.

6. In apparatus for photographing actual or simulated aerial combat, in combination, a machine gun, electrically actuated means for firing said gun, a motion picture camera for photographing the results of actual or simulated fire of said gun, electrically actuated means for operating said camera, a camera circuit energizable to actuate said camera operating means, a gun circuit energizable for actuating said gun firing means, and means including a normally open switch in said camera circuit actuated by said gun circuit upon energization thereof for closing said camera circuit, whereby the gun and camera are operated simultaneously, said last-mentioned means including apparatus rendered operative upon deenergization of said gun circuit for effecting deenergization of said camera circuit after a predetermined period of time, thereby maintaining operation of the camera subsequent to deenergization of said gun circuit and accordingly said gun firing means, said circuit closing means also including a device for conditioning for operation said apparatus upon energization of said gun circuit.

7. In apparatus for photographing actual or simulated aerial combat, in combination, a machine gun, electrically actuated means for firing said gun, a motion picture camera for photographing the results of actual or simulated fire of said gun, electrically actuated means for operating said camera, a camera circuit energizable to actuate said camera operating means, a gun circuit energizable for actuating said gun firing means, means operated by said gun circuit upon energization thereof for effecting energization of said camera circuit for operating the gun and camera simultaneously, means including a dash pot rendered operative upon deenergization of said gun circuit for effecting deenergization of said camera circuit after a predetermined period of time, thereby maintaining operation of the camera subsequent to deenergization of said gun circuit and accordingly of said gun firing means, and means operated by said gun circuit upon energization thereof for loading said dash pot.

8. In apparatus for photographing actual or simulated aerial combat, in combination, a machine gun, electrically actuated means for firing said gun, a motion picture camera for photographing the results of actual or simulated fire of said gun, electrically actuated means for operating said camera, a camera circuit energizable to actuate said camera operating means, a gun circuit energizable for actuating said gun firing means, a solenoid in said gun circuit and actuated upon energization thereof, means responsive to actuation of said solenoid to effect energization of said camera circuit, whereby the gun and camera are operated simultaneously, means including a dash pot rendered operative upon deenergization of said gun circuit for effecting deenergization of said camera circuit after a predetermined period of time, thereby maintaining said camera operating subsequent to deenergization of said gun circuit and accordingly said gun firing means, and means forming a connection between said solenoid and dash pot for conditioning for operation said dash pot upon energization of said solenoid.

9. In apparatus for photographing actual or simulated aerial combat, in combination, a machine gun, electrically actuated means for firing said gun, a motion picture camera for photographing the results of actual or simulated fire of said gun, electrically actuated means for operating said camera, a camera circuit energizable to actuate said camera operating means, a gun circuit energizable for actuating said gun firing means, means operated by said gun circuit upon energization thereof for effecting energization of said camera circuit, whereby the gun and camera are operated simultaneously, time delay means rendered operative upon deenergization of said gun circuit for effecting deenergization of said camera circuit after a predetermined time, thereby maintaining said camera operating subsequent to deenergization of said gun circuit and accordingly said gun firing means, means conditioning for operation said time delay means upon energization of said gun circuit, means for actuating said camera operating means exclusively of said time delay means so that the gun and camera cease operating simultaneously, and means associated with said camera for making a mark on the film only when said time delay means is operative.

10. In apparatus for photographing actual or simulated aerial combat, in combination, a machine gun, electrically actuated means for firing said gun, a motion picture camera for photographing the results of actual or simulated fire of said gun, electrically actuated means for operating said camera, a camera circuit energizable to actuate said camera operating means, a gun circuit energizable for actuating said gun firing means, means operated by said gun circuit upon energization thereof for effecting energization of said camera circuit, whereby the gun and camera are operated simultaneously, time delay means rendered operative upon deenergization of said gun circuit for effecting deenergization of said camera circuit after a predetermined time, thereby maintaining said camera operating subsequent to deenergization of said gun circuit and accordingly said gun firing means, means conditioning for operation said time delay means upon energization of said gun circuit, a third circuit including a heater disposed in said camera, and thermostatic switch means in said third circuit for effecting energization thereof and accordingly of said heater when the temperature in the camera falls below a predetermined level.

RICHARD F. FISCHER.
ERNEST B. BALDRIDGE